United States Patent
Ronning (10) Patent No.: US 10,605,528 B2
(45) Date of Patent: Mar. 31, 2020

(54) THREE STAGE SINGLE PASS DRYING APPARATUS FOR PARTICULATE MATERIALS

(71) Applicant: Ronning Engineering Company, Inc., Leawood, KS (US)

(72) Inventor: Richard Ronning, Leawood, KS (US)

(73) Assignee: Ronning Engineering Company, Inc., Leawood, KS (US)

( * ) Notice: Subject to any disclaimer, the term of this patent is extended or adjusted under 35 U.S.C. 154(b) by 23 days.

(21) Appl. No.: 15/937,321

(22) Filed: Mar. 27, 2018

(65) Prior Publication Data

US 2019/0301799 A1  Oct. 3, 2019

(51) Int. Cl.
 *F26B 11/02* (2006.01)
 *F26B 11/04* (2006.01)

(52) U.S. Cl.
 CPC .......... *F26B 11/045* (2013.01); *F26B 11/022* (2013.01); *F26B 11/028* (2013.01); *F26B 11/0477* (2013.01); *F26B 11/026* (2013.01)

(58) Field of Classification Search
 USPC ......... 34/602, 603, 129, 109, 108, 485, 520, 34/519, 495, 493, 482, 413, 443, 130, 34/132, 599, 595, 201, 202, 209, 210, 34/241
 See application file for complete search history.

(56) References Cited

U.S. PATENT DOCUMENTS

| | | | |
|---|---|---|---|
| 4,193,208 A | 3/1980 | Ronning | |
| 5,157,849 A * | 10/1992 | Ronning | F26B 11/0477 34/135 |
| 5,305,533 A * | 4/1994 | Alexander | F26B 11/028 34/108 |
| 6,584,699 B2 | 7/2003 | Ronning et al. | |
| 7,654,011 B2 | 2/2010 | Ronning et al. | |
| 2002/0184787 A1 * | 12/2002 | Ronning | F26B 11/028 34/134 |
| 2014/0315270 A1 * | 10/2014 | Nguyen | C12P 19/14 435/162 |
| 2019/0241834 A1 * | 8/2019 | Lee | C11B 13/00 |

* cited by examiner

*Primary Examiner* — John P McCormack
(74) *Attorney, Agent, or Firm* — Hovey Williams LLP (57) ABSTRACT

A single pass, multiple stage, rotary drum heat exchange dryer (22) is provided for drying products such as distillers grains and includes a tubular shell (64) with a moist product inlet (66), an opposed dried product outlet (70), and an internal drying chamber (78). The chamber (78) includes a convection drying first stage (80), and conductive drying final curing stage (82) an intermediate stage (84); the intermediate stage (84) is subdivided into a plurality of contiguous drying zones (86-92). The zones (86-92) include individual flighting assemblies (164) which are of substantially the same density and heat transfer ratios.

20 Claims, 10 Drawing Sheets

THREE STAGE SINGLE PASS DRYING APPARATUS FOR PARTICULATE MATERIALS

BACKGROUND OF THE INVENTION

Field of the Invention

The present invention is broadly concerned with high density, multiple stage, single pass rotary drum dryers especially useful for the high-efficiency drying of moisture-laden products. More particularly, the invention is concerned with such dryers which include an initial, primarily convection drying stage, a final, primarily conductive drying stage, and an intermediate multiple-zone stage where both convective and conductive drying occurs. The individual zones within the intermediate stage are equipped with internal flighting designed so as to provide a substantially uniform heat transfer ratio (the total zone heat transferring surface area divided by the zone volume) along the length of the intermediate stage.

Description of the Prior Art

Drying of large volumes of fragmented fibrous materials has long been carried out in heat exchangers consisting of one or more elongated, generally horizontally oriented drums. Hot gases are caused to flow through each to remove moisture from the material by heat exchange between the hot gases and the fibrous product. Generally, a burner is disposed to direct hot products of combustion directly into the inlet of the drum which also receives the moisture-bearing material to be dried. However, advantage has also been taken of other sources of waste heat. After removal of the requisite amount of moisture from the material, the dried product is directed into a collector or other receiving means at the outlet of the heat exchange drum. A blower or equivalent device is provided to accomplish the required rate of flow of hot gases through the drum heat exchanger.

Three pass dryers have been used in the past which include a single rotatable drum with concentric stages arranged so that the material being dried traverses the drum in a serpentine fashion. Three pass dryers are relatively expensive but have been used primarily because of the decreased product residence time necessary to obtain adequate drying, while minimizing ground space in the drying plant. A limiting factor in the use of three pass dryers has been the restricted inlet opening of the concentrically arranged drying zones, thus resulting in a fairly severe heat transfer in the first pass. High temperatures have been tolerated in the first pass of the three pass dryers in connection with the drying of alfalfa because the product typically is introduced into the three-pass dryer at a moisture level of about 80%. The latent heat transfer that occurs in the first pass thereby protects the product notwithstanding the high-temperature level that exists in the first pass drying zone.

In the case of prior single pass dryers, efforts to increase the airflow velocity simply resulted in excessive blowing of the material out of the dryer and resulting inadequate product retention time. A by-product of the decreased retention time was a lessening of the Δ T between the inlet and outlet temperatures of the dryer. Even at air velocities of no more than about 500 feet per minute, the resulting discharge temperature on most products was found to be in the range of 300° F. to 350° F. Single pass dryers, as contrasted with three pass dryers, are particularly useful for drying temperature-sensitive products that either have a substantially lower initial moisture content than relatively wet alfalfa, as for example about 30%, or that are blended with previously dried material to bring the moisture content of the product entering the inlet of the dryer to about that moisture level. The single pass dryer may be operated at a substantially higher throughput than a three-pass dryer. In addition, high temperature levels in the initial drying stage are avoided as occurs in the first pass of a three pass dryer.

U.S. Pat. No. 4,193,208 illustrates a single pass dryer having inwardly extending internal flighting within the drum which caused the material conveyed through the dryer to be lifted up and then dropped back into the hot gas stream, rather than simply resting at the bottom of the drum as it was rotated. The secondary flighting in the central part of the drum was provided to enhance heat exchange between the hot gases directed through the drum and the product to be dried. In order to prevent hot gases from being blown directly through the dryer from one end to the other, single pass dryers have included transverse plates in the drum to obstruct the flow of hot gases therethrough. The net result of such constructions was to decrease the capacity of the dryer while at the same time interfering with uniform temperature control and preventing maintenance of constant material flow rates through the dryer.

U.S. Pat. No. 5,157,849 illustrates and describes an improved single pass dryer having circumferentially spaced, inwardly directed, product conveying and showering conductive and convective heat transfer flights extending inwardly toward the center of the drum where the total surface area of the flights is at least as about as large as the total heat transfer surfaces of the products to be dried at maximum throughput capacity. The flighting design of the '849 patent leaves a flight-free central showering zone of a size to permit heat exchange and conveyance of material along the length of the dryer at a predetermined rate, and establishes a specific range of diameter ratio between the diameter of the drum and the diameter of the internal cylindrical flight-free central product showering zone.

U.S. Pat. No. 6,584,699, which is incorporated by reference herein in its entirety, illustrates a single pass dryer comprising three drying stages: a convection drying first stage, an intermediate stage, and a conductive drying final curing stage. The intermediate stage is subdivided into a plurality of contiguous drying zones having fighting assemblies of increasing density and progressively increasing heat transfer ratios. It was discovered that such dryers present difficulties in handling high-density moist particulate materials, such as distillers grains mixed with condensed distillers solubles (also known as "syrup"). The addition of syrup to the wet distillers grains has a significant effect on how the particulate product flow through the dryer. It has been discovered that the syrup inhibits the "showering" effect of the particulate material as it flows through the dryer and causes more of the product to stay in the outer periphery of the drum as opposed to being more evenly distributed toward the center. This reduces dry efficiency and necessitates a reduction in product throughput in order to obtain a finished product with the desired moisture characteristics at the dryer outlet.

SUMMARY OF THE INVENTION

The present invention provides an improved single pass drum dryer exhibiting enhanced drying efficiencies, particularly when drying high-density, high-moisture content materials. Broadly speaking, the drum dryer of the invention includes an elongated, hollow drum having a moist product inlet and a spaced dried product outlet, with a drying chamber between the inlet and the outlet. Flighting is provided within the drum which effectively separates the drying chamber into a plurality of drying stages, including a first stage adjacent the inlet, a final stage adjacent the outlet, and at least one intermediate stage between the first and final stages. The intermediate stage includes a plurality of drying zones arranged in successive order, from a point proximal to the first stage and extending towards the final stage. Each of the zones is configured with internal flighting having heat transfer surfaces that define a predetermined ratio calculated by dividing the total heat transferring surface area within the zone by the volume of the zone. The flighting is arranged so that the heat transfer ratio of at least two of the zones, and preferably all of the zones, is approximately the same. In one particular embodiment, the at least two zones have a heat transfer ratio of about 2.25 to about 3.25 ft$^{-1}$.

The preferred design of dryers in accordance with the invention is that the intermediate stage zones are arranged in contiguous relationship, with the first zone being contiguous with the first stage and the last zone being contiguous with the final dryer stage. The number of intermediate stage zones is variable, but usually ranges from 2-8, with four zones being most preferred.

The intermediate stage zones are advantageously equipped with heat transfer flighting which presents a series of inwardly extending, circumferentially spaced apart metallic heat transfer panels, with the number of panels in at least two of the zones, and preferably all of the zones, being essentially the same. In practice, the panels are supported on corresponding strut elements coupled to the inner surface of the drum; these strut elements support L- and Z-shaped members which cooperatively define the individual panels.

The final stage of the preferred dryer has a heat transfer ratio smaller than the heat transfer ratio of any of the intermediate stage zones, and is preferably designed as a curing chamber of the type described in U.S. Pat. No. 5,157,849, incorporated by reference herein in its entirety.

In operation, initially moist product (e.g., distillers grain, bakery wastes, alfalfa, peat moss, wood materials or similar particulates) is introduced into the dryer inlet along with heated air during rotation of the drum. In one particular embodiment, the moist product comprises a mixture of distillers grains and condensed distillers solubles. Preferably, the moist product comprises from about 20% to about 50% by weight of the condensed distillers solubles and from about 50% to about 80% by weight of the moist distillers grains. Most preferably, the moist product comprises about 40% condensed distillers solubles and about 60% moist distillers grains. Typically, the moisture content of the incoming product would range from about 30-80% by weight, more preferably from about 50% to about 75% by weight, and most preferably from about 60% to about 70% by weight. The inlet air temperature is generally from about 600-1800° F.; where distillers grain products are being dried, the temperature would be normally be from about 550-700° F. Airflow rates through the dryer would commonly range from about 60,000 CFM to about 180,000 CFM, or higher.

As the product is advanced along the length of the drum by virtue of drum rotation and passage of air therethrough, it is progressively dried. At the same time, the air temperature decreases along the drum length. In the distillers grain example, the air would have a temperature of around 450° F. as it enters the intermediate stage, and a temperature of about 225-250° F. into the third stage. The exiting air would have a temperature on the order of 190° F. In the first stage, product drying is primarily from convective heat transfer, while in the second stage a combination of convection and conductive drying is carried out in the final stage, almost all of the product drying is accomplished by conduction.

By configuring at least two, and preferably all, drying zones of the intermediate stage to have essentially the same flighting configuration and heat transfer ratio, the present invention overcomes the problem of inefficient showering effect that was exhibited with previous dryer designs having progressively increasing flight density within the intermediate stage drying zone. Surprisingly, it was discovered that not only can sufficient drying of the material be accomplished in this manner, but that air flow rates through the dryer are not sacrificed, and in some instances, are actually capable of being increased while still maintaining the desired air discharge temperatures.

DETAILED DESCRIPTION OF THE PREFERRED EMBODIMENTS

Figure 1:
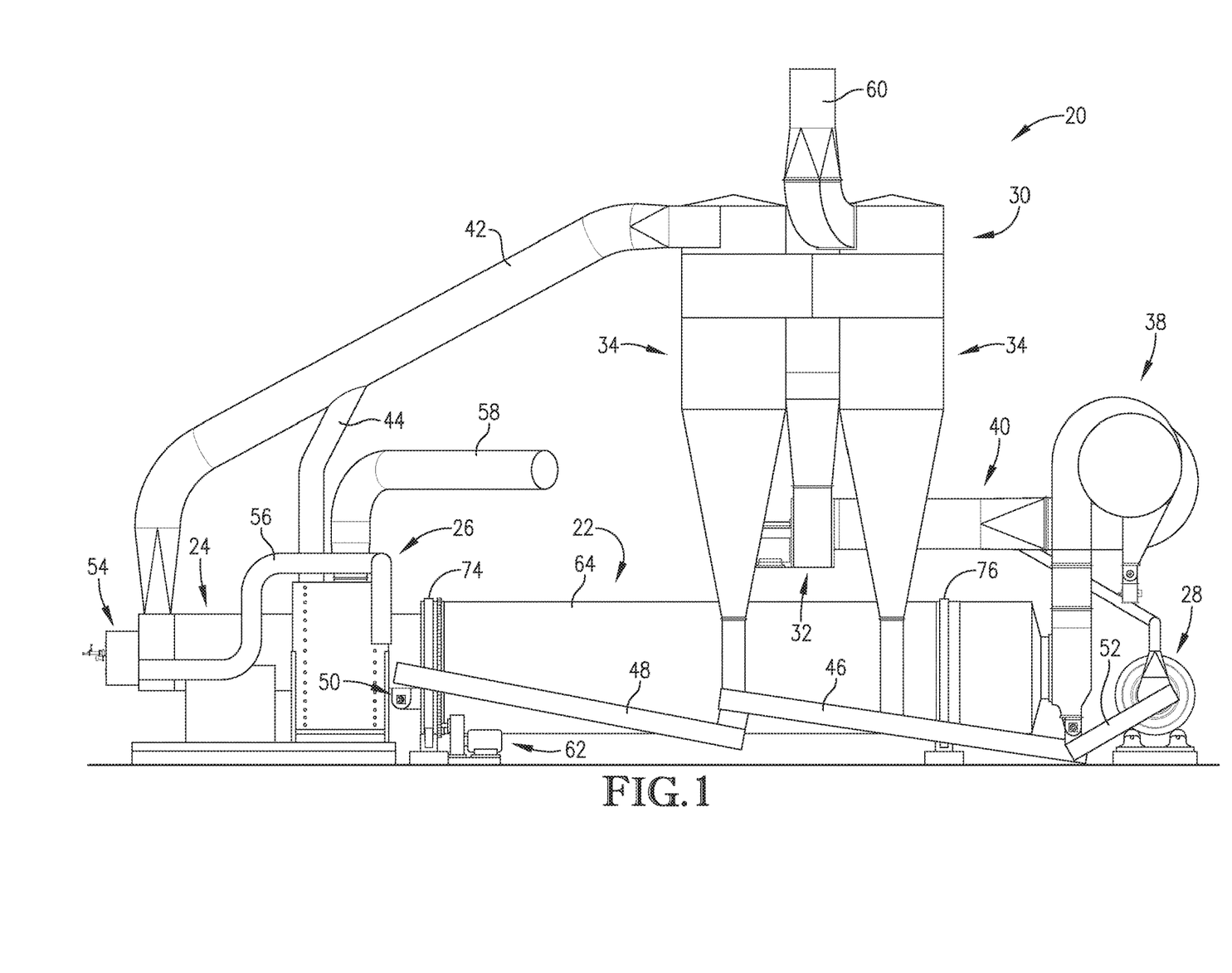
FIG. 1 is an elevational view of an overall product drying assembly including the preferred rotary drum dryer of the invention as a part thereof.

Turning now to the drawings, and in particular FIG. 1, an overall product drying assembly 20 in accordance with the invention includes a rotary drum dryer 22 adapted to receive and dry a particulate material, with a furnace 24 and blending chamber 26 adjacent the inlet of the dryer 22, and a cooling drum 28 at the outlet end of the drum for receiving and cooling dried product. The assembly 20 further includes an air-handling unit 30, including a primary fan 32, recycle collector 34, discharge collector 36, dual inlet centrifugal separator 38, and ducting 40 interconnecting the collectors 34-38 and fan 32. An optional return air conduit 42 extends from the top of recycle collector 34 to the inlet of furnace 24 and has an intermediate blending air conduit 44 leading to chamber 26. A pair of tandem-mounted product recycle screw conveyors 46 and 48 extend along the length of drum 22 from the outlet end thereof to a product input conveyor 50, and receive output from the collectors 34 and 36. Similarly, a dried product screw conveyor 52 extends from the outlet end of the dryer 22 to cooling drum 28. The furnace 24 is equipped with a gas-fired burner 54 as well as a gas recycle conduit 56 from blending chamber 26. The latter may include a boiler gas recycle duct 58 as shown. Air discharge from the assembly 20 is provided via discharge duct 60 coupled to collector 36.

During use of the assembly 20, the dryer 22 is rotated (typically at a speed of from about 3-12 rpm) by means of trunnion drive 62, while heated air is delivered to the input end of the drum by means of furnace 24, blending chamber 26 and air handling unit 30. Initially, moist product is delivered to conveyor 46 by conventional means (not shown), with a predetermined portion of partially dried product being transferred by conveyors 46, 48 from the outlet end of the dryer back to conveyor 46 for recycling through the dryer. The air-handling unit 30 serves to move air throughout the assembly 20, with exhaust through duct 60 and product dropout through the collectors 34-36-38, as will be understood by those skilled in the art.

Figure 2:
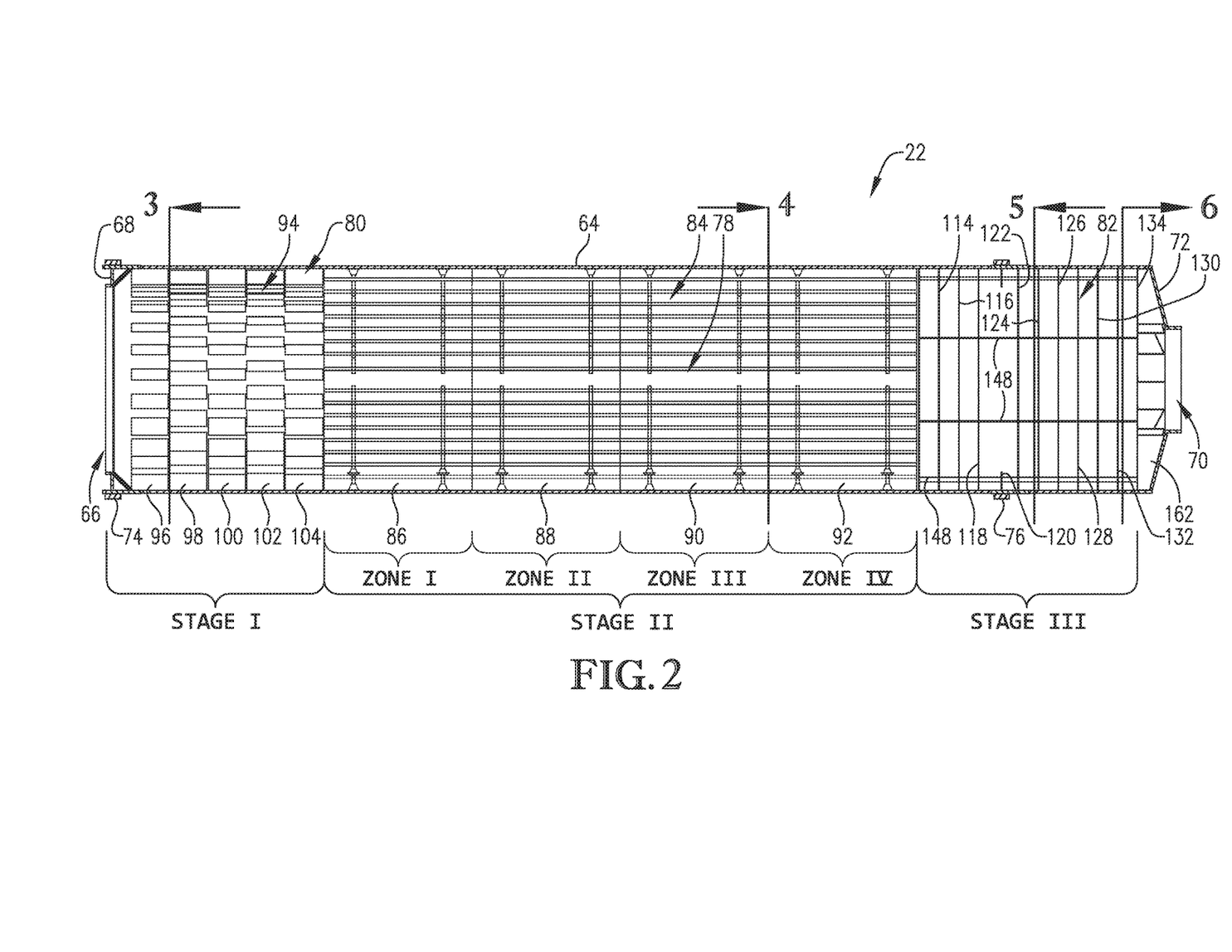
FIG. 2 is a vertical sectional view of the preferred drum dryer depicted in FIG. 1.

The drum dryer 22 includes an elongated, circulated in cross-section tubular metallic shell 64 presenting an inlet 66 defined by inwardly extending, flanged circular wall 68, and an outlet 70 formed by a flanged, tapered segment 72 of the shell 64. It will be observed that the inlet 66 and outlet 70 are essentially concentric and in opposed relationship. A pair of trunnion tracks 74, 76 are secured to the outer surface of shell 64 and engage corresponding trunnion wheel assemblies.

Referring to FIG. 2, it will be seen that the interior of drum dryer 22 is provided with differently configured heat transfer flighting along the length thereof between inlet 66 and outlet 70, effectively forming an internal drying chamber 78 presenting a first stage 80 (Dryer Stage I), a final stage 82 (Dryer Stage III), and an intermediate stage 84 (Dryer Stage II). The intermediate stage 84 is in turn subdivided into four contiguous drying zones 86 (Zone I), 88 (Zone II), 90 (Zone III), and 92 (Zone IV), with the first zone 86 being contiguous with first stage 80 and fourth zone 92 contiguous with final stage 82.

Figure 3:
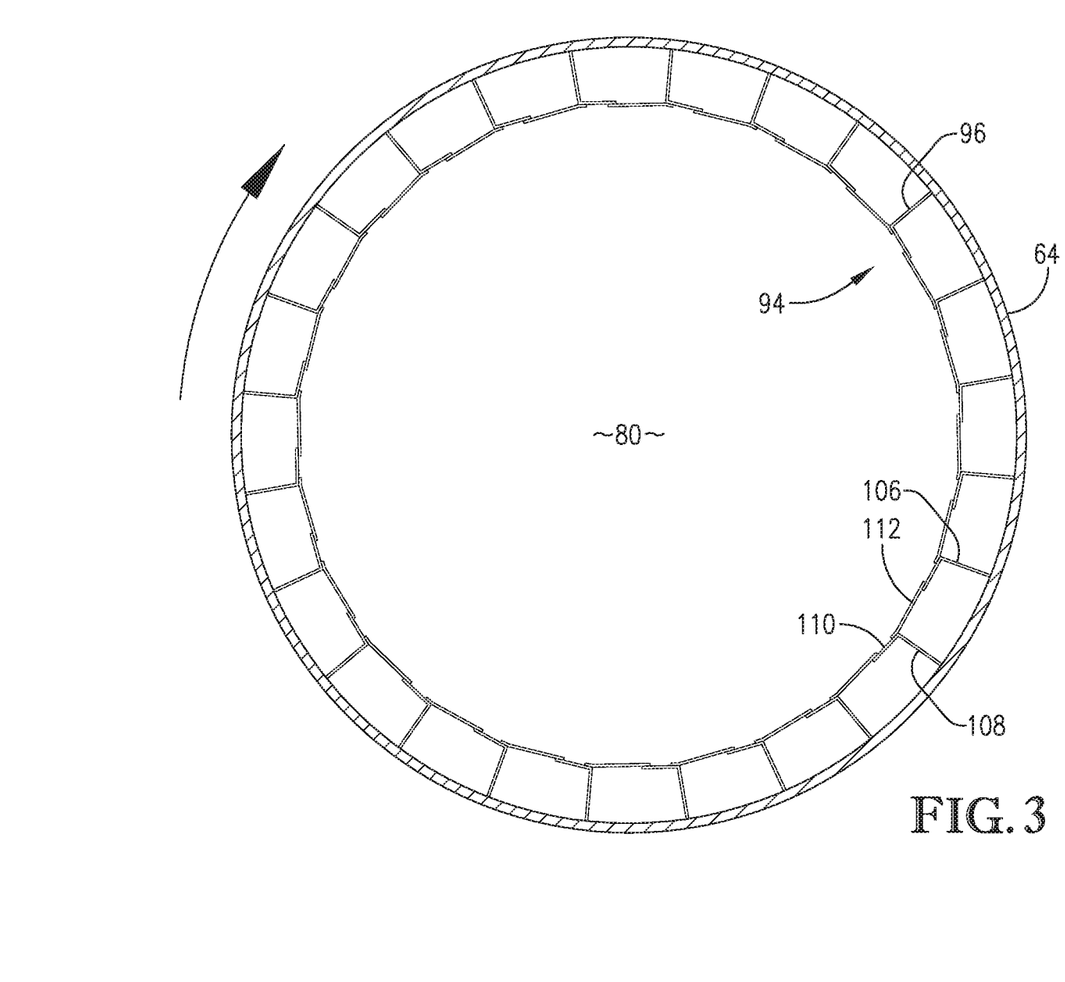
FIG. 3 is a vertical sectional view taken along line 3-3 of FIG. 2 and illustrating the flighting used in the first drying stage of the drum dryer.
Figure 8:
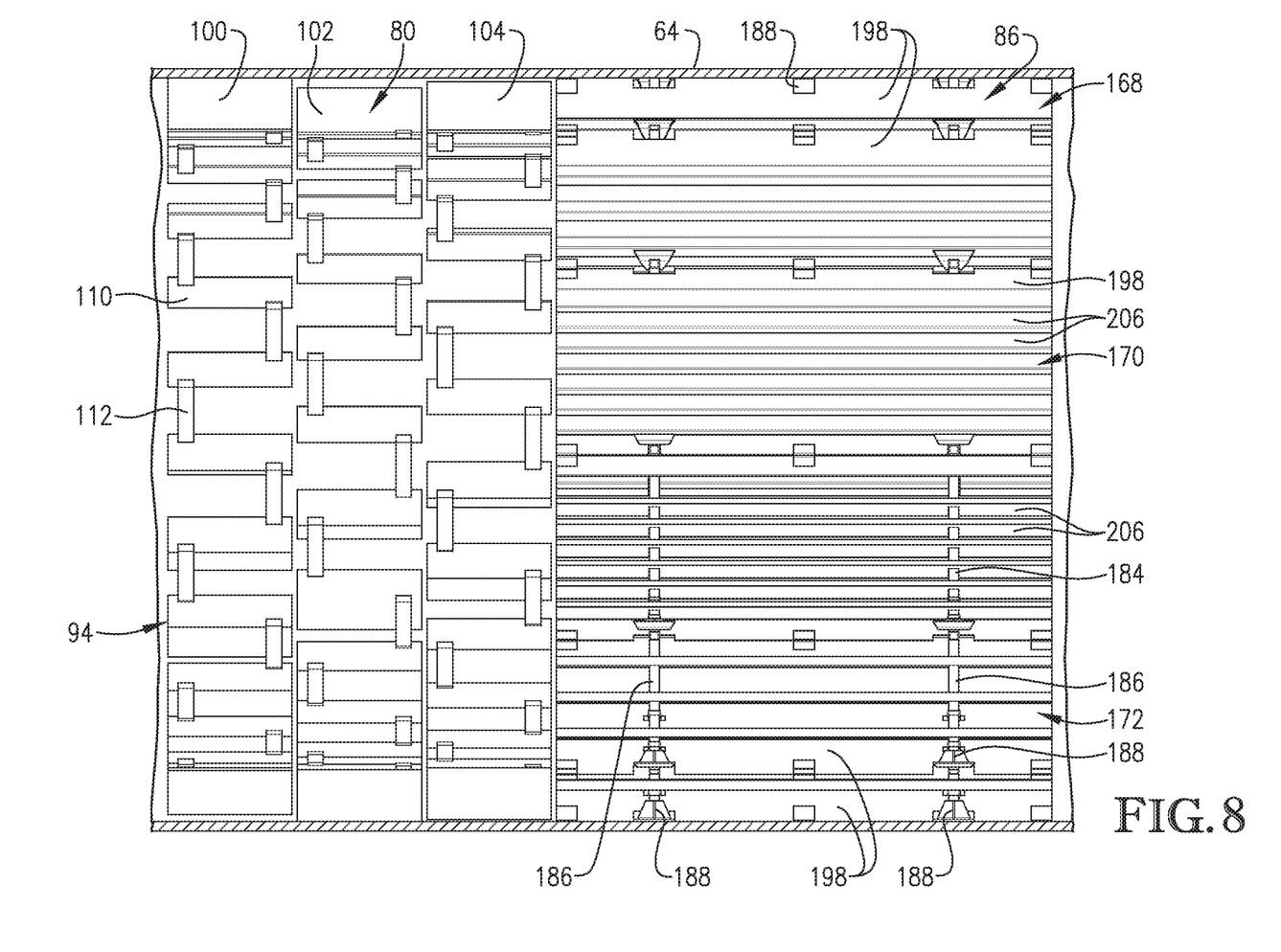
FIG. 8 is an enlarged, fragmentary vertical sectional view of a portion of the drum dryer and depicting in greater detail the fighting employed in the first stage and the initial zone of the intermediate stage of the dryer.

As shown in FIGS. 3 and 8, the first stage 80 is equipped with flighting broadly referred to by numeral 94 comprising a total of five adjacent, axially spaced apart rows 96-104 of flighting elements. Each of the rows 96-104 is made up of a plurality of identical, circumferentially spaced apart L-shaped flighting members 106, each presenting a first leg 108 secured to the inner surface of shell 64 by welding or the like, and a transverse leg 110 in spaced relationship from the shell 64. As best seen in FIGS. 3 and 10, the adjacent transverse legs 110 in each of the flighting rows 96-104 are interconnected by elongated metallic straps 112. It will also be seen that the flighting members 106 of each of the rows 96-104 are circumferentially offset from the flighting members in adjacent rows. In the illustrated embodiment, each successive row 98-104 is offset 5° from the preceding row.

Figure 5:
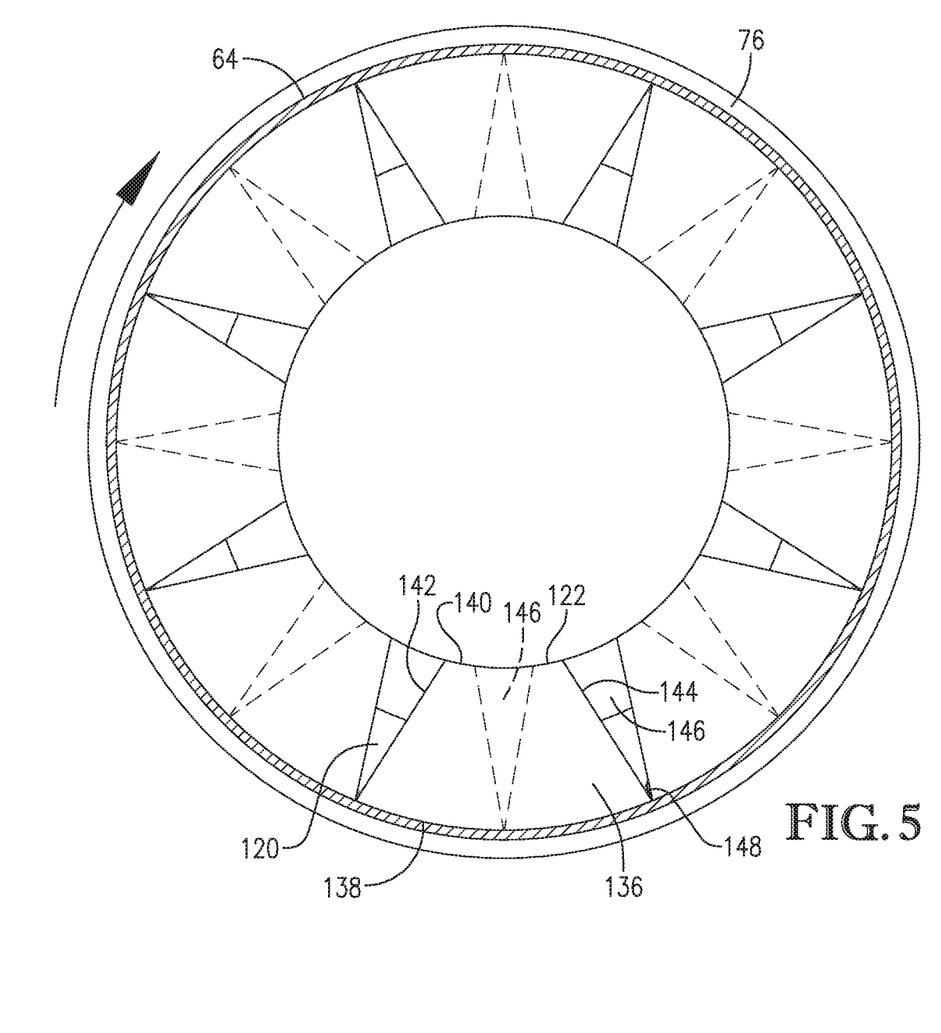
FIG. 5 is a vertical sectional view taken along line 5-5 of FIG. 2 and illustrating the fighting used in the final drying stage of the drum dryer.
Figure 6:
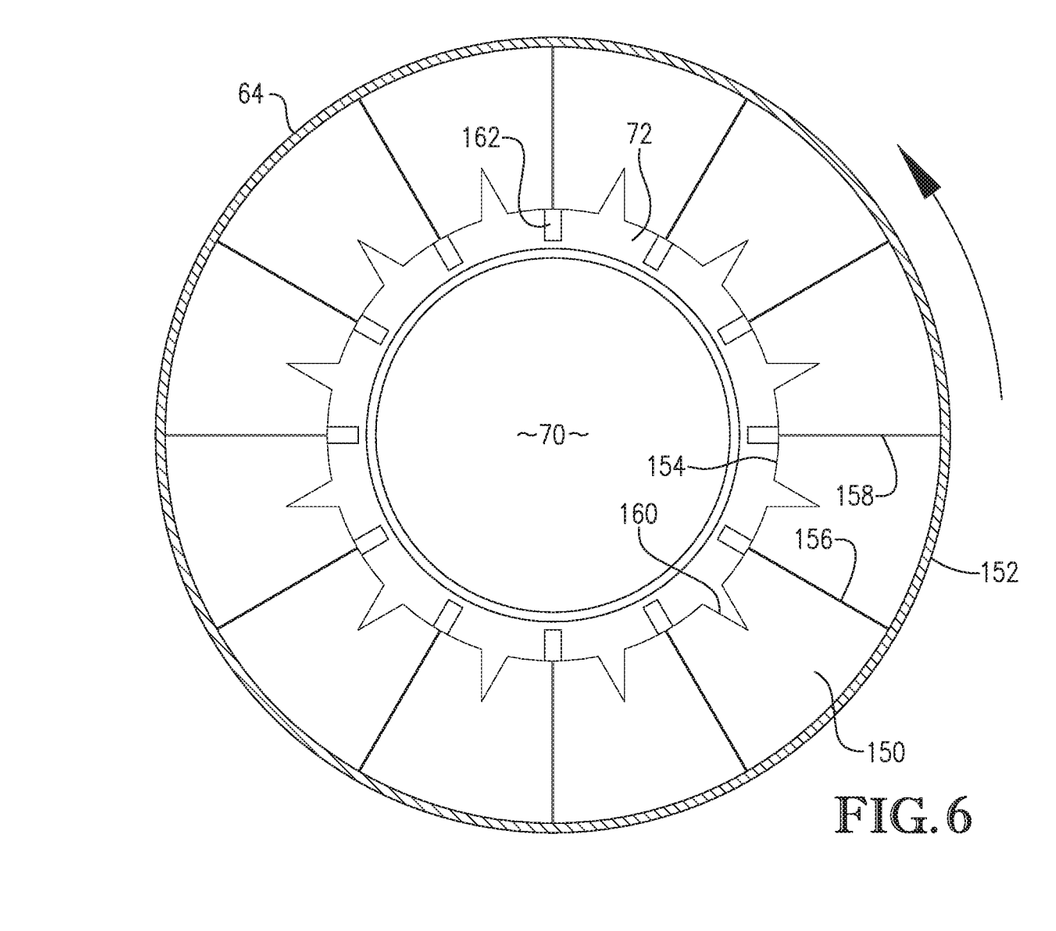
FIG. 6 is a vertical sectional view taken along line 6-6 of FIG. 2 and illustrating additional fighting used in the final drying stage of the drum dryer.

The final stage 82 is in effect a curing stage for the product prior to exiting from the dryer 22, and is described in U.S. Pat. No. 5,157,849 incorporated by reference herein. This stage is equipped with an inner set of three sector plate assemblies 114-118, an intermediate, inwardly extending annular wall 120, a further set of six sector plate assemblies 122-132 and a final sector plate assembly 134. Each of the sector plate assemblies 114-118 and 122-132 are identical and include (see FIG. 5) a plurality of circumferentially arranged, somewhat trapezoidal plates 136 each presenting an arcuate outer margin 138 secured by welding or the like to the inner face of shell 64, a complemental, arcuate inner margin 140 and a pair of side margins 142, 144 which diverge from the ends of inner margin 140 to the ends of outer margin 138. The plates 136 are arranged in close proximity at their respective outer margins 138 thereby defining a series of substantially V-shaped passageways 146 between adjacent pairs of the plates 136. Adjacent ones of the sector plate assemblies 114-118 and 122-132 are offset from each other so that the V-shaped passageways 146 formed by each of the sector plate assemblies are likewise offset as depicted in FIG. 5. Finally, the stage 82 has a plurality of elongated, axially extending vanes 148 secured to the interface of shell 64. The final sector plate assembly 134 is depicted in FIG. 6 and is made up of a series of circumferentially arranged sector plates 150 each presenting an outer margin 152 secured to shell 64, inner margin 154 and side margins 156, 158. A shallow V-shaped groove 160 is formed at the center of each plate 150 as illustrated.

A series of circumferentially spaced lifter plates 162 are located between the outer surface of sector plate assembly 134 and the inner face of shell segment 72. The plates 162 extend from the main body of shell 64 to a point adjacent the outlet 70.

The intermediate stage 84 is designed so that the heat transfer ratio defined thereby remains substantially constant from the inlet end of the stage adjacent first stage 80 to the outlet end of the stage adjacent final stage 82. This is accomplished by providing uniform construction and density of the flighting component within each of the zones 86-92. Unlike the dryer embodiment illustrated in U.S. Pat. No. 6,584,699, the flighting density and heat transfer ratio does not progressively increase from the inlet to first zone 86 to the outlet of the final zone 92 of intermediate stage 84. In a preferred embodiment, the heat transfer ratio within each of the zones is from about 2.25-3.25 ft$^{-1}$.

Figure 4:
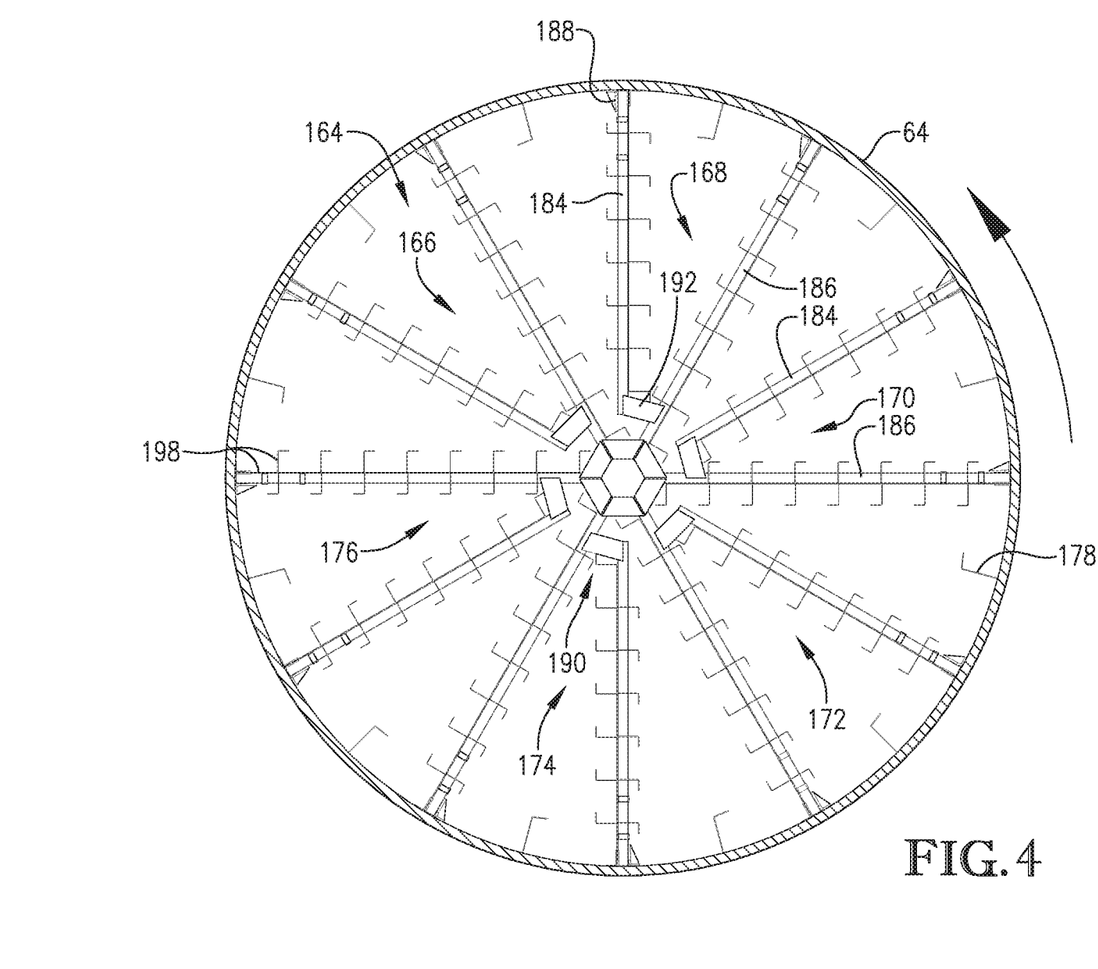
FIG. 4 is a vertical sectional view taken along line 4-4 of FIG. 2 and illustrating the fighting used in the first drying zone of the intermediate stage of the drum dryer.

Referring to FIG. 4, the flighting assembly 164 includes six V-frame assemblies 166, 168, 170, 172, 174, and 176 spaced about the interior of the shell 64 with intermediate L members 178 within each V-frame assembly and between the respective assemblies.

In more detail, each V-frame assembly 166-176 includes two aligned strut units 180 and 182 (see FIGS. 7a and 7b), with each strut unit made up of a pair of strut tubes 184 and 186. The strut tubes 184 and 186 are secured to the inner face of shell 64 by means of wed brackets 188 and extend inwardly in a radial direction to an apex 190. Generally, trapezoidal gusset plates 192 interconnect the inner end of tube 184 and an inboard portion of tube 186. The inner ends of tubes 184 from adjacent V-frame assemblies are interconnected by additional trapezoidal gusset plates 194. The aligned strut tubes 184, 186 of each strut tube unit 180, 182 support elongated, metallic heat transfer plates 196, i.e., the plates 196 bridge the aligned tubes 184 and the aligned tubes 186. The plates 196 include an outermost, somewhat L-shaped plate 198 having a laterally extending segment 200 and a short, transverse segment 202. The L-shaped plate 198 is secured to the outboard ends of the aligned tubes 184, 186 by welding using clips 204. In addition, the plates 196 include a series of generally Z-shaped intermediate plates 206 supported on the aligned tubes 186, 186. Specifically, each of the Z-shaped plates 206 includes a central planar segment 208, an aperture, outboard transverse segment 210, and an inboard transverse segment 212. Each segment 210 has a pair of spaced-apart openings 214 formed therein which are adapted to receive the respective tubes 184 or 186. During construction, a series of the Z-shaped plates 206 are slid onto the aligned tubes 184, 186 so that the plates 206 are in abutting contact, and these are welded in place to the strut tubes. The outermost L-shaped plate 198 is then positioned on the outer ends of the aligned struts and secured in place via welding and the clips 204. At this point, the end most brackets 188 are welded to the strut tubes permitting the entire V-frame to be secured to shell 64. In preferred practice, the plates 198 and 206 extend the full width of the zone and may be of any desired length, e.g., 8 feet. In addition, the plates 196 may be spaced from each other in various increments. It is preferable, though, for the spacing between plates 196 to be uniform. In certain embodiments, the spacing between plates 196 is from about 6 to about 10 inches, and more preferably, about 8 inches.

Figure 7A:
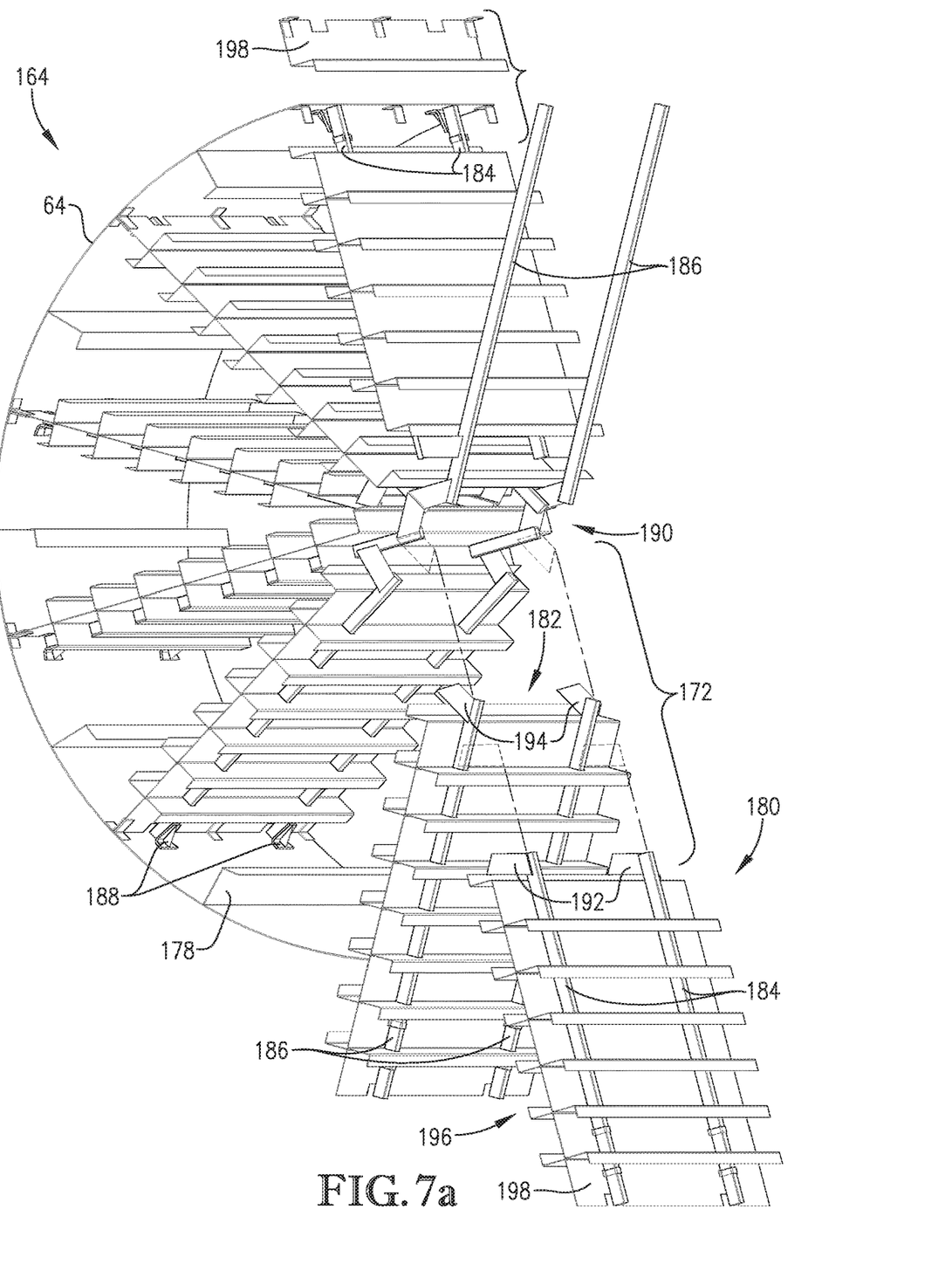
FIG. 7a is an exploded view illustrating the construction of the preferred fighting used in the intermediate stage of the drum dryer.
Figure 7B:
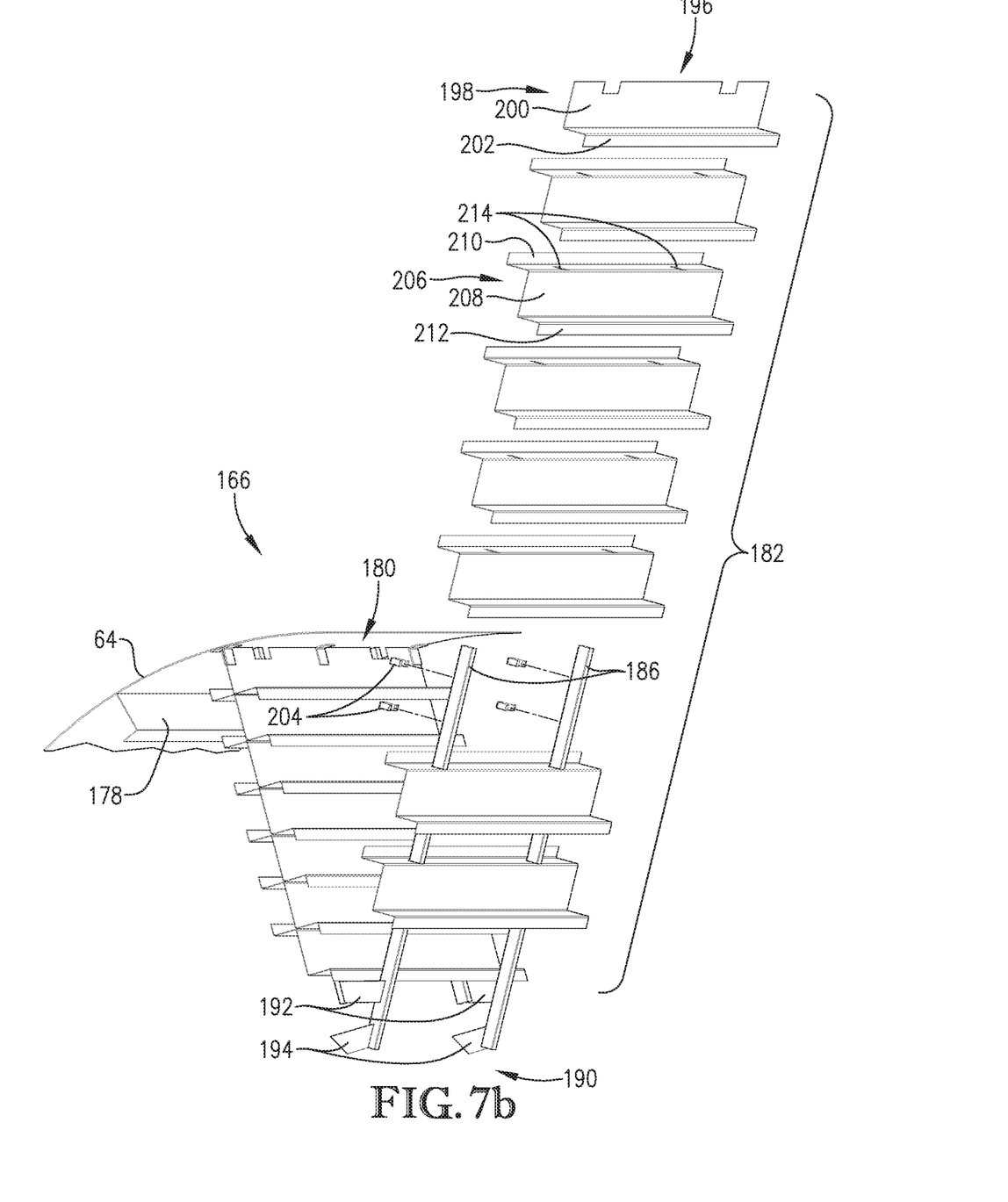
FIG. 7b is a close up, exploded view of one V-frame flighting assembly.

It will thus be appreciated that the flighting assembly 164 presents a total of twelve generally radially oriented, spaced apart, essentially continuous heat exchange panels defined by the plates 196 which extend the full length of the zone.

Drying assembly 20 is particularly well suited for drying high-density particulate materials without sacrificing material through-put times as compared with conventional single-pass dryers that employs an intermediate stage having drying zones with progressively increasing heat transfer ratios. As disclosed in U.S. Pat. No. 6,584,699, a drum dryer having a twelve-foot diameter, that is about 44 to about 58 feet in length, and comprising an intermediate stage with drying zones of progressively increasing heat transfer ratios may be operated at air flow velocities of 100,000 to 180,000 CFM. However, the dryer disclosed in the '699 patent is not capable of maintaining these high air flow velocities when drying distillers grains mixed with significant quantities of condensed distillers solubles ("syrup"). The wet distillers grains being fed to the dryer generally have a density of approximately 47.0 lb/ft$^3$. However, the syrup portion is much denser having a density of approximately 68 lb/ft$^3$. Both the syrup and wet distillers grains comprise approximately 68% moisture when fed to the dryer. It was discovered that the syrup inhibits the "showering" effect of the particulate material as it flows through the dryer and causes more of the product to stay in the outer periphery of the drum as opposed to being more evenly distributed toward the center. Therefore, in order to obtain a finished product of the desired moisture content, typically about 10% by weight, the residence time of the product in the dryer must be increased and/or recycle of dried product into the dryer must be increased. Either way, the product rate declines accordingly.

It was discovered that the problem with prior dryer designs could be overcome by replacing the flighting of the drying zones of the intermediate stage that have progressively increasing heat transfer ratios with uniformly configured flighting that results in a substantially constant heat transfer ratio across at least two, but preferably all, drying zones of the intermediate stage.

In certain embodiments, the temperature of the gases introduced into the inlet 66 of the dryer 22 may range from 500° F. to as much as 1,800° F. In the case of products to be dried that contain a protein and/or fat content that is to be protected against excessive temperatures, the inlet temperature of the drying airstream is usually recommended to be less than about 700° F., and especially between about 550° F. to about 700° F. Under these conditions the dryer 22 can process wet particulate matter that has a total moisture content of up to 70% or 75% by weight. Preferably, in embodiments in which the material being dried comprises a mixture of distillers grains and syrup, the moisture level of the material introduced into the process is from about 50% to about 75% by weight, from about 60% to about 70% by weight, or about 65% to about 68% by weight. The temperature in the outlet of the drum dryer 22, in the case of a 700° F. inlet temperature, will be no more than about 180° F. to about 200° F., when the drum is rotated from 4 to 12 rpms and usually about 6 rpms.

Although a preferred drum dryer 22 in accordance with this invention contains 12 radial flighting arms as illustrated in the drawings, it is to be understood that other numbers of radial flighting arms, e.g., 8, 10, 14, 16, etc., may be used. When wet material having an initial moisture content of about 68% is introduced into the inlet 66 of drum dryer 22 at a preferred drying gas inlet temperature of about 700° F. and the inlet air velocity is of the order of 165,000 CFM, the temperature of the material entering the intermediate stage 84 will generally be about 400° F. to 450° F. The temperature of the material entering the curing or final stage 82 will be about 225° F. to 270° F., and the outlet temperature will be from about 180° F. to 200° F. The air volume out of the outlet 70 of the drum dryer 22 will nominally be about 125,000 CFM. Most importantly, the temperature of the heat transfer media or air/water vapor mixture as it is conveyed through the first, second and third drying zones 86-92 of intermediate stage 84 decreases relatively uniformly, and is consecutively lowered about 60° F. through each stage.

As material dries along the length of a single pass dryer, the particles tend to accelerate as the moisture content decreases and the particles become lighter, even though there is some decrease in velocity of the air flow. It is to be recognized that material being dried is initially carried by the surfaces of the radial flighting in each of the zones 86-92 until such time as the material may fall from the flighting surface as a result of gravity. Thus, material falls from a respective radial flight surface twice during each rotation of the drum.

In the drying zones having 12 radial flights, the material during each 180° of rotation of the drum will fall a distance that averages approximately ⅙ of the diameter of the drum. Accordingly, conductive heat transfer and convective heat transfer tends to remain substantially the same throughout the length of the intermediate stage 86. The residence time of the material decreases somewhat in each successive zone due to the tendency for the velocity of the material to increase along the length of the dryer as the particles dry out.

The drum dryer 22 of assembly 20 is particularly useful for drying products that have a relatively high-fat content, as for example distillers grain that is generally known as DDGS. Other materials that may beneficially be dried in assembly 20 include hydrolyzed feather meal, potato waste, high-fat bakery feed or fish meal which has very fragile oils. In some instances, a proportion of the dried material outfeed from drum dryer 22 will be recycled back to the inlet of the dryer for blending with the moist product to provide the desired inlet moisture content for the feed material. In certain embodiments in which the dryer 22 is used to process meal products such as DDGS, corn gluten feed, hydrolyzed feather meal, and municipal sludge system performance can be improved by recycling at least 60%, at least 70%, or at least 80%, and preferably from about 60% to about 90%, from about 65% to about 85%, or from about 70% to about 80% of the dried material to the dryer inlet. In particular, the recycled product is mixed with the wet matter that is being fed to the dryer in order to provide a moist feed product Recycling the dried product increases the surface area of the product in the drying process making for a vastly improved heat transfer rate. The formula for the heat transfer rate is $Q=hA(T-t)$, where h is the film coefficient, A is the surface area of the product being dried, T is the hot gas temperature, and t is the product temperature.

EXAMPLE

In this Example, two processes for drying distillers grain from an ethanol plant were simulated and compared. Case A involves the use of a three-stage dryer 400 having an intermediate stage with zones of progressively increasing flighting density constructed per U.S. Pat. No. 6,584,699. Case B utilizes an otherwise identical system, except that dryer 400 comprises an intermediate stage with zones having the same heat transfer ratio. The drying process set up (FIG. 9) is similar to that illustrated in FIG. 3 of U.S. Pat. No. 7,654,011, incorporated by reference in its entirety.

Figure 9:
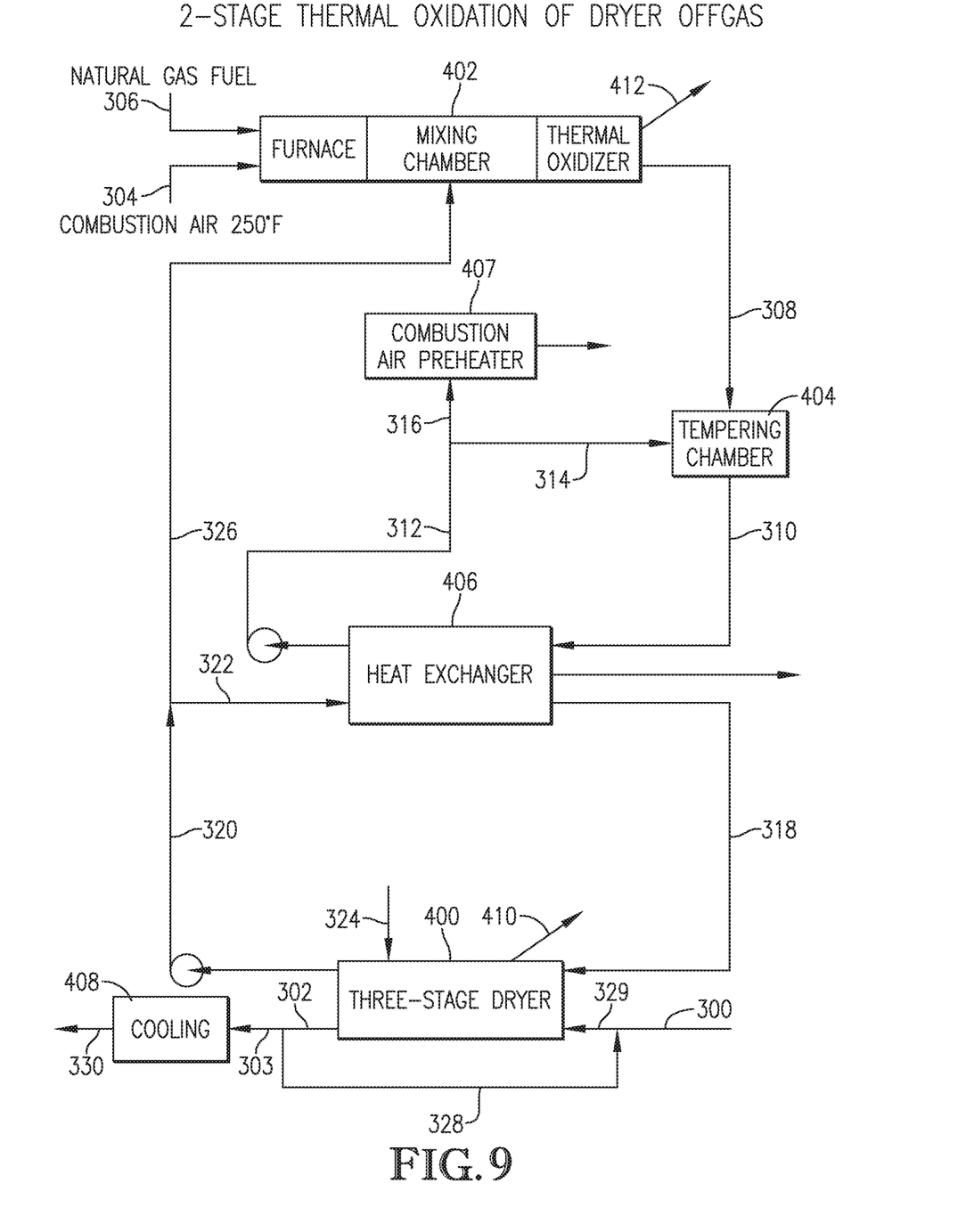
FIG. 9 is a flow diagram of an exemplary process for drying particulate material and treating dryer off gas.

Generally, moist distillers grains are fed to dryer 400 by line 300 at 65% moisture content. The dried distillers grains exit dryer 400 by line 302 at 12% moisture. A portion of the product in line 302 is recycled to the dryer inlet by line 328 where it is combined with the moist feed to form a combined stream 329. The non-recycled portion of the dried product is directed via line 303 to a cooling vessel 408 where additional moisture is removed. The finished product is recovered from cooling vessel 408 by line 330. Drying air provided to dryer 400 by line 318, which is heated in heat exchanger 406. Dryer off-gas is removed from dryer 400 by line 320. A majority of the dryer off-gas is recycled to heat exchanger 406 by line 322. The air provided to the hot side of heat exchanger 406 is provided primarily by a gas-fired heater 402, which comprises a furnace, mixing chamber, and thermal oxidizer. Preheated combustion air is provided to heater 402 by line 304. Natural gas fuel is provided to heater 402 by line 306. In addition, dryer off-gas is also provided to heater 402, and specifically to the mixing chamber, by line 326. The hot air from heater 402 is directed to a tempering chamber 404 by line 308, where it is mixed with a portion of cooled gas from heat exchanger 406 via line 314. The tempered air is directed to heat exchanger 406 by line 310. Cooled gas exits heat exchanger 406 via line 312, the majority of which, represented by line 316, is used to preheat the combustion air within preheater 407.

The results of each simulation are provided in Tables 1, 2 and 3 below.

TABLE 1

| | Product flow | | | | | |
|---|---|---|---|---|---|---|
| | 300 | | 302 | | 303 | |
| | A | B | A | B | A | B |
| Total mass flow rate (lb/hr) | 51,429* | 77,143** | 120,455 | 180,682 | 20,455 | 30,682 |
| Moisture percentage | 65% | 65% | 12% | 12% | 12% | 12% |
| Solids flow rate(lb/hr) | 18,000 | 27,000 | 106,000 | 159,000 | 18,000 | 27,000 |
| Moisture flow rate (lb/hr) | 33,429 | 50,143 | 14,455 | 21,681 | 2,455 | 3,682 |
| Stream temperature (° F.) | 170° F. | 170° F. | 210° F. | 210° F. | 210° F. | 210° F. |

| | 328 | | 329 | | 330 | |
|---|---|---|---|---|---|---|
| | A | B | A | B | A | B |
| Total mass flow rate (lb/hr) | 100,000 | 150,000 | 151,430 | 227,143 | 20,000 | 30,000 |
| Moisture percentage | 12% | 12% | 30% | 30% | 10% | 10% |
| Solids flow rate(lb/hr) | 88,000 | 132,000 | 106,000 | 159,000 | 18,000 | 27,000 |
| Moisture flow rate (lb/hr) | 12,000 | 18,000 | 45,430 | 68,143 | 2,000 | 3,000 |
| Stream temperature (° F.) | 210° F. | 210° F. | — | — | — | — |

*Wet cake flow rate = 30,857 lb/hr, syrup flow rate = 20,572 lb/hr
**Wet cake flow rate = 46,286 lb/hr, syrup flow rate = 30,857 lb/hr

TABLE 2

| | Air flow | | | | | | | | | |
|---|---|---|---|---|---|---|---|---|---|---|
| | 304 (combustion air) | | 306 (natural as fuel) | | 308 | | 310 | | 312 | |
| | A | B | A | B | A | B | A | B | A | B |
| Temperature | 250° F.* | 250° F.* | — | — | 1460.1° F. | 1484.1° F. | 1200° F. | 1200° F. | 400° F. | 400° F. |
| Mass flow rate (lb/hr) | 42,114 | 62,414 | 1,900 | 2,816 | 84,189 | 120,891 | 113,920 | 167,649 | 113,920 | 167,649 |
| Mass flow rate $N_2$ (lb/hr) | 32,194 | 47,712 | — | — | 39,375 | 54,964 | 53,280 | 76,223 | — | — |
| Mass flow rate $O_2$ (lb/hr) | 9,726 | 14,414 | — | — | 4,904 | 6,243 | 6,635 | 8,658 | — | — |
| Mass flow rate $CO_2$ (lb/hr) | 21 | 31 | — | — | 4,858 | 7,198 | 6,574 | 9,982 | — | — |
| Mass flow rate $H_2O$ (lb/hr) | 174 | 257 | — | — | 35,052 | 52,486 | 47,430 | 72,786 | — | — |
| Volumetric flow rate (acfm) | 13,156 | 19,497 | — | — | 88,093 | 129,161 | 103,054 | 152,936 | 53,380 | 79,217 |

TABLE 2-continued

Air flow

| BTU/hr | — | — | 41,581,338 | 61,624,183 | — | — | — | — | — | — |

*Combustion air supplied at 50° F. is preheated to 250° F., 40% excess

|  | 314 | | 316 | | 318 | | 320 | | 322 | |
| --- | --- | --- | --- | --- | --- | --- | --- | --- | --- | --- |
|  | A | B | A | B | A | B | A | B | A | B |
| Temperature | 400° F. | 400° F. | 400° F.* | 400° F.* | 880° F. | 622° F. | 230° F. | 230° F. | 230° F. | 230° F. |
| Mass flow rate (lb/hr) | 29,731 | 46,758 | 84,189 | 120,891 | 117,773 | 288,407 | 157,947 | 344,069 | 117,773 | 288,407 |
| Mass flow rate $N_2$ (lb/hr) | 13,905 | 21,259 | 39,375 | 54,964 | 20,617 | 36,440 | 27,650 | 43,473 | 20,617 | 36,440 |
| Mass flow rate $O_2$ (lb/hr) | 1,732 | 2,415 | 4,904 | 6,243 | 6,229 | 11009 | 8,353 | 13,134 | 6,229 | 11,009 |
| Mass flow rate $CO_2$ (lb/hr) | 1,716 | 2,784 | 4,858 | 7,198 | 13 | 24 | 18 | 28 | 13 | 24 |
| Mass flow rate $H_2O$ (lb/hr) | 12,378 | 22,094 | 35,052 | 52,486 | 90,914 | 240,934 | 121,926 | 287,433 | 90,914 | 240,934 |
| Volumetric flow rate (acfm) | 13,931 | | 39,448 | 57,123 | 101,789 | 206,544 | 70,277 | 157,108 | 52,402 | 131,692 |

*After passage through combustion air preheater, T = 327° F.

|  | 324 (air leaks) | | 326 | |
| --- | --- | --- | --- | --- |
|  | A | B | A | B |
| Temperature | 50° F. | 50° F. | 230° F. | 230° F. |
| Mass flow rate (lb/hr) | 9,200 | 9,200 | 40,174 | 55,661 |
| Mass flow rate $N_2$ (lb/hr) | 7,033 | 7,033 | 7,033 | 7,033 |
| Mass flow rate $O_2$ (lb/hr) | 2,125 | 2,125 | 2,125 | 2,125 |
| Mass flow rate $CO_2$ (lb/hr) | 5 | 5 | 5 | 5 |
| Mass flow rate $H_2O$ (lb/hr) | 38 | 38 | 31,012 | 46,499 |
| Volumetric flow rate (acfm) | 2,064 | 2,064 | 17,875 | 25,416 |

TABLE 3

Equipment

|  | 400 (dryer) | | 406 (heat exchanger) | | 407 (combustion air preheater) | | 408 (cooling vessel) | |
| --- | --- | --- | --- | --- | --- | --- | --- | --- |
|  | A | B | A | B | A | B | A | B |
| Evaporation Rate (lb/hr $H_2O$) | 30,974 | 46,461 | — | — | | | 454.5 | 681.8 |
| Q (BTU/hr) | 32,584,081 | 48,624,595 | 32,784,081 (hot side) 32,584,081 (cool side) | 48,824,595 (hot side) 48,624,595 (cool side) | 2,048.8 | 3,036.3 | — | — |
| LMTD (° F.) | — | — | 237.15 | 333.39 | 207.05 | 206.43 | — | — |
| Dryer losses (stream 410) (BTU/hr) | 100,000 | 100,000 | — | — | — | — | — | — |

Gas-fired heater 402 assumed radiation and convection losses, indicated by stream 412, of 200,000 BTU/hr.

As can be seen from the data, the original progressively increasing drying zones dryer of Case A, processing 51,429 lb/hr, requires 41,581,338 BTU/hr, or an energy consumption of 1342 BTU/lb of water evaporated. The dryer of Case B, having substantially uniform drying zones, processing 77,143 lb/hr, requires 61,624,183 BTU/hr, or energy consumption of 1326 BTU/lb of water evaporated. Thus, the data demonstrates that the dryer of Case B permits a higher product throughput and higher air flow rates through the dryer, while drying more efficiently that the dryer of Case A and while maintaining the same desired air discharge temperature. Moreover, because the dryer of Case B accommodates a larger mass flow rate of material, a larger recycle mass flow rate can also be used (i.e., about 50% greater than Case A). This increase in recycle mass flow rate results in a correspondingly greater heat transfer rate (Q) due to the additional surface area provided by the extra recycled material.

I claim:

1. A rotary drum dryer, comprising:
an elongated, hollow drum having a moist product inlet and a spaced dried product outlet, with a drying chamber between the inlet and the outlet; and
fighting within said drum dividing the chamber into a plurality of drying stages along the length of the chamber, including a first stage adjacent said inlet, a final stage adjacent said outlet, and at least one intermediate stage between the first and the final stages, said intermediate stage including a plurality of drying zones arranged in successive order from a point proximal to said first stage and extending towards the final stage, each of said zones configured to define a heat transfer ratio calculated by dividing the total heat-transferring surface area within the zone by the volume of the zone, each of said zones having approximately the same heat transfer ratio each of said zones including heat transfer flighting comprising a plurality of strut elements coupled to said drum and extending inwardly thereof, with a number of spaced apart heat transfer plates secured to corresponding strut elements.

2. The dryer of claim 1, said zones arranged in contiguous relationship along the length of said intermediate stage.

3. The dryer of claim 1, one of said zones being in contiguous relationship with said first stage.

4. The dryer of claim 1, another of said zones being in contiguous relationship with said final stage.

5. The dryer of claim 1, there being a total of four of said zones along the length of said intermediate stage.

6. The dryer of claim 1, said final stage having a heat transfer ratio smaller than the heat transfer ratio of any of said zones.

7. The dryer of claim 1, each of said zones comprising a total of 12 strut elements.

8. The dryer of claim 1, said heat transfer plates being spaced approximately 8 inches from any adjacent heat transfer plate on the same strut.

9. The dryer of claim 1, each of said zones comprising substantially the same fighting density.

10. The dryer of claim 1, said first stage including heat transfer flighting comprising a number of circumferentially spaced apart generally L-shaped members secured to said drum and extending inwardly thereof, each of said L-shaped members including a first leg secured to said drum and a second leg oriented at an angle relative to said first leg.

11. The dryer of claim 10, said L-shaped members being arranged in generally circumferentially aligned and axially spaced apart rows, each of said rows being circumferentially offset relative to the adjacent row.

12. The dryer of claim 10, including strap members extending between and interconnecting the second leg members of adjacent, circumferentially spaced apart L-shaped members.

13. The dryer of claim 1, said inlet and said outlet being in general axial alignment with each other at respective ends of said drum.

14. A method of drying a moist particulate material comprising:
   introducing said moist particulate material into the rotary drum dryer of claim 1;
   passing a hot dryer gas stream through the inlet of said drum;
   contacting said dryer gas stream with said moist particulate material within the drum so as to remove moisture from the moist particulate material; and
   discharging a dried particulate material from the product outlet.

15. The method of claim 14, wherein the moist particulate material comprises a mixture of moist distillers grains and condensed distillers solubles.

16. The method of claim 15, wherein the moist particulate material comprises from 20% to 50% by weight of the condensed distillers solubles and from 50% to 80% by weight of the moist distillers grains.

17. The method of claim 15, wherein the moist particulate material comprises about 40% by weight of the condensed distillers solubles.

18. The method of claim 15, wherein the moist distillers grains and condensed distillers solubles have a combined moisture content of from 50% to 75% by weight.

19. The method of claim 14, wherein the hot dryer gas stream entering the inlet of the drum has a temperature of from 550° F. to 700° F.

20. The method of claim 14, the method further comprising recycling at least 60% of the dried particulate material from the product outlet to the inlet.

* * * * *